United States Patent [19]

Ramazzotti et al.

[11] 4,003,501
[45] Jan. 18, 1977

[54] FLUID IMPINGEMENT MIXING APPARATUS

[75] Inventors: Dario J. Ramazzotti, Tallmadge; Geza A. Thiry, Ravenna, both of Ohio

[73] Assignee: McNeil Corporation, Akron, Ohio

[22] Filed: Mar. 12, 1975

[21] Appl. No.: 557,574

[52] U.S. Cl. .............................. 222/135; 222/145; 222/149; 222/318; 222/334; 222/559; 259/8

[51] Int. Cl.[2] .......................................... B67D 5/60

[58] Field of Search .......... 222/135, 145, 318, 504, 222/334, 559, 388, 424, 149; 425/244; 259/4 R, 8, 7, 18; 239/117–118, 414, 125

[56] References Cited

UNITED STATES PATENTS

| | | | |
|---|---|---|---|
| 2,642,206 | 6/1953 | Reed | 222/145 X |
| 2,905,361 | 9/1959 | Noall | 222/145 X |
| 3,051,455 | 8/1962 | Magester | 259/8 |
| 3,111,389 | 11/1963 | Nansen et al. | 259/7 X |
| 3,207,486 | 9/1965 | Rosenthal | 259/8 |
| 3,558,051 | 1/1971 | Strickler | 222/145 X |
| 3,622,050 | 11/1971 | Action et al. | 222/334 X |
| 3,687,370 | 8/1972 | Sperry | 239/117 X |
| 3,746,311 | 7/1973 | Harper et al. | 259/7 |
| 3,788,337 | 1/1974 | Breer | 259/8 X |
| 3,790,030 | 2/1974 | Ives | 222/145 X |
| 3,799,199 | 3/1974 | Rumpff | 259/461 X |
| 3,799,403 | 3/1974 | Probst et al. | 222/135 |

*Primary Examiner*—Robert B. Reeves
*Assistant Examiner*—Charles A. Marmor
*Attorney, Agent, or Firm*—Hamilton, Renner & Kenner

[57] ABSTRACT

Disclosed is a device which permits a plurality of fluids to be received in a mixing chamber simultaneously through nozzles from fluid input chambers. Actuation of a fluid cylinder opens valves so that the fluids are received under pressure in the input chambers. A second fluid cylinder then opens the mixing chamber so that the nozzles emit both fluids simultaneously which mix by impingement and thereafter are dispensed from the mixing chamber. When the valves are closed recirculation is accomplished through a plurality of ports, thereby allowing the fluids to remain at desirable temperatures and viscosity.

8 Claims, 2 Drawing Figures

FLUID IMPINGEMENT MIXING APPARATUS

BACKGROUND OF THE INVENTION

This invention relates to the impingement mixing of two or more fluids. More particularly, this invention relates to an apparatus for mixing and dispensing two or more viscous fluids at high pressure, for producing urethane foam or like material.

Precise mixing of a plurality of fluids, such as the chemicals which make up urethane foam, is highly important to the quality of the product. Proper mixing of these viscous materials under high pressure and temperature controlled conditions is difficult to obtain. In one prior art device, of which we are aware, two fluids are first permitted to comingle in a common chamber. Then the chamber is opened so that the fluids may be dispensed and the mixing thereof is effected by the rotation of a plunger in the chamber. This procedure provides inadequate mixing and dispensing of foam material for a number of reasons. First, when the fluids are permitted to comingle in a common chamber, precise pressure control is necessary to assure that no backflow is created in one line or the other. Further, the mixing which is accomplished by agitation is simply not sufficient to assure a satisfactory product and therefore plunger rotation is required. In addition, no means are provided to recirculate the fluids to maintain them at the precise temperature required to assure a proper chemical reaction upon mixture.

In one device which does provide for recirculation of the fluids when the nozzles are closed, the diversion of the streams of fluid from recirculation to feed is accomplished merely by the opening of the nozzles themselves. This is undesirable primarily because the recirculation must be accomplished at the high pressures necessary to effect the mixing.

SUMMARY OF THE INVENTION

It is thus a primary object of the present invention to provide an apparatus for precise impingement mixing of viscous fluids for subsequent discharge.

It is another object of the present invention to provide an apparatus, as above, which permits recirculation of the fluids at low pressures.

It is a further object of the present invention to provide an apparatus, as above, in which the fluids are temperature controlled.

It is an additional object of the present invention to provide an apparatus, as above, which can mix a plurality of fluids simultaneously without any lead or lag therebetween.

It is still another object of the present invention to provide an apparatus, as above, which prevents the fluid in one line from backing up into another fluid line.

It is yet another object of the present invention to provide an apparatus, as above, in which the discharge line is automatically purged without the need of utilizing purging or flushing chemicals.

These and other objects of the present invention which will become apparent from the following description are accomplished by the means hereinafter described and claimed.

In general, an apparatus for the impingement mixing of a plurality of fluids includes a mixing chamber which receives fluid under pressure from a plurality of nozzles, and from which the fluid is dispensed. Fluid under pressure is provided to a plurality of fluid input chambers which communicate with the nozzles. Means are provided to prevent the fluid from entering the mixing chamber until after each input chamber receives fluid under pressure so that at the time the fluids are mixed, the fluids may be dispensed from the mixing chamber.

DESCRIPTION OF THE PREFERRED EMBODIMENT

Figure 1:
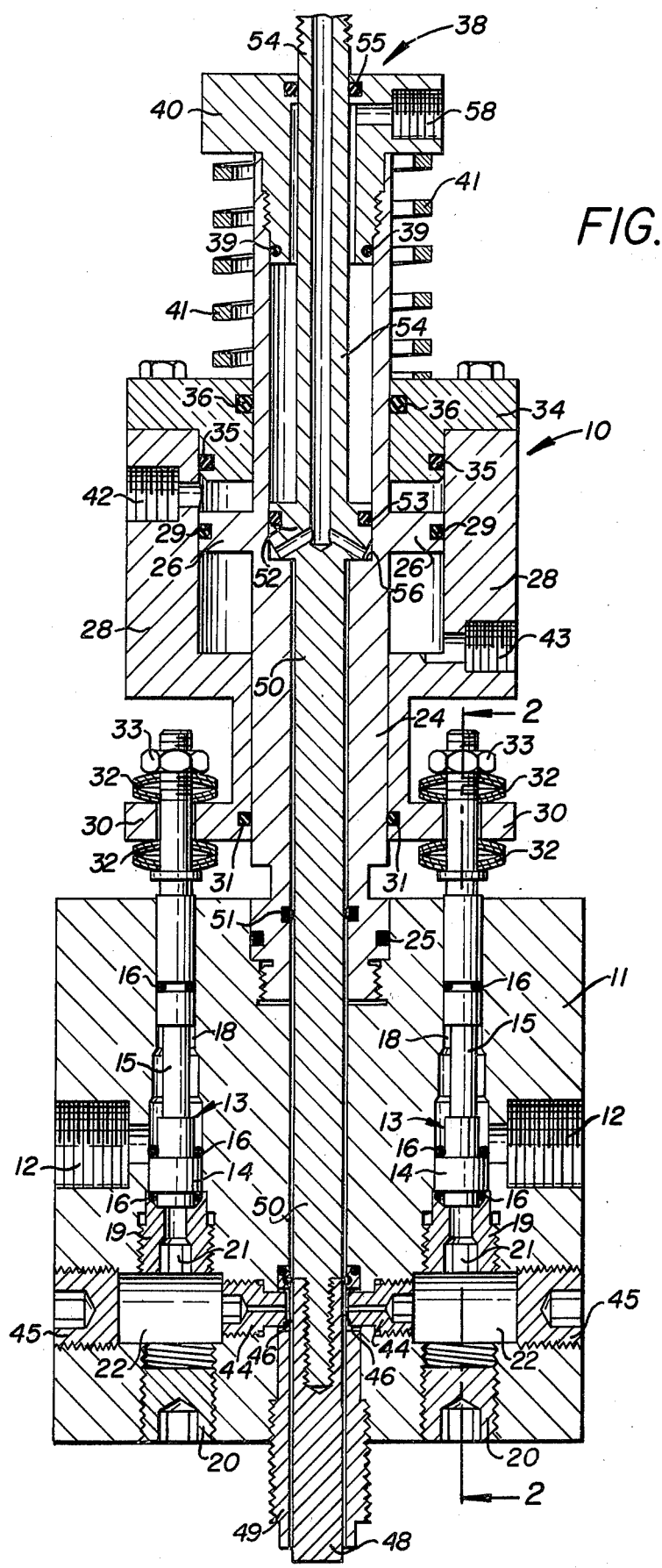
FIG. 1 is a vertical sectional view of the fluid impingement mixing apparatus according to the concept of the present invention.

The apparatus for mixing and thereafter dispensing a plurality of fluids is indicated generally by the numeral 10 in FIG. 1 and includes a housing 11. Housing 11 is bored to form fluid input ports 12 which can be connected by hoses, piping or the like to a temperature regulated fluid supply (not shown). Although two passages 12 and their related assemblies, yet to be described, are shown by way of example, it is to be understood that the mixing apparatus 10 of this invention could be utilized to receive, mix and dispense essentially any number of fluids. For each fluid port 12 there is a poppet valve assembly, indicated generally by the numeral 13, which includes a valve body 14, stem 15, and suitable seals, all indicated by the numeral 16. Valves 13 are situated in a vertical bore 18 in housing 11 into which is threaded a valve seat 19. Plug members 20 close off bore 18 and provide access to the valves 13, as may be necessary.

Figure 2:
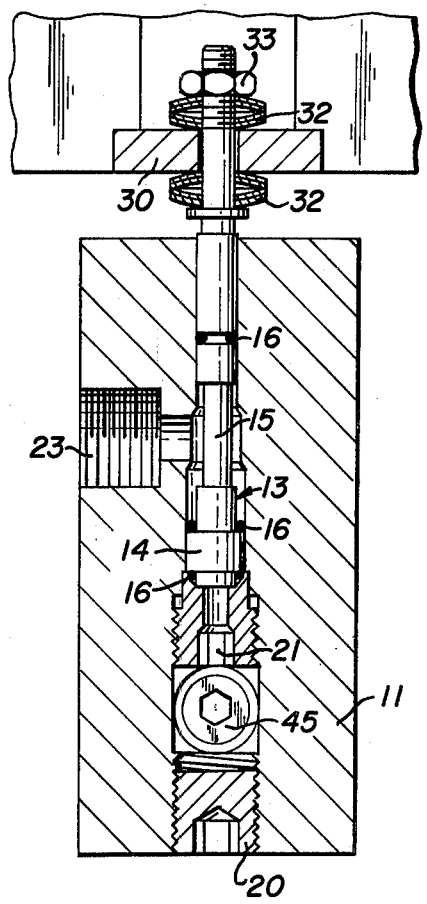
FIG. 2 is a sectional view taken substantially along line 2—2 of FIG. 1.

Each valve seat 19 has a passage 21 therein to permit fluid to pass therethrough into fluid input chambers 22. As shown in FIG. 1, valve bodies 14 are seated on valve seats 19, therefore being in their down position, so that fluid cannot be received through passages 21 and into chambers 22. As such, the fluid passes from ports 12 above the valve bodies 14, through bores 18 and out recirculation bores 23 (FIG. 2). With suitable fittings, hoses, piping and the like (not shown) the fluid is thus recirculated back to the supply at a low pressure where it can pass through heat exchangers or the like to be maintained at a constant temperature and thereafter fed back to port 12.

The top of housing 11 receives a fixed hollow piston rod 24 with O-rings 25 being provided as a seal. Rod 24 is flanged to form piston 26 within fluid cylinder housing 28. An O-ring 29 is provided as a seal between piston 26 and cylinder 28 to divide the cylinder into two chambers. The lower portion of cylinder 28 includes an annular flange 30 which is bored to receive valve stems 15. Again, an O-ring seal 31 is provided between flange 30 and piston rod 24. Springs 32 are provided around stems 15 on each side of flange 30 and are held thereto by nuts 33.

The top of cylinder housing 28 is closed off by cylinder cap 34 with O-ring 35 providing the seal. Piston rod 24 extends through cylinder cap 34, with a suitable O-ring seal 36 and a cylinder cap indicated generally by the numeral 38, fits within the top of rod 24 and has an O-ring 39 to form the seal therebetween. Cap 38 includes an annular flange 40 to provide a suitable bearing surface for spring 41 which extends between flange 40 and cylinder cap 34. Spring 41 acts to assure that valves 13 remain fully closed during periods of nonoperation.

Upon the introduction of fluid within cylinder 28 through port 42 therein, cylinder 28 moves upward overcoming the bias of spring 41. Such movement opens valves 13 diverting fluid coming from input ports 12 from recirculation bore 23 to fluid input chambers 22. Springs 32 assure that the valves open evenly in the event of any cocking of rod 24 due to manufacturing variances of housing 11. To reverse the operation, fluid is introduced through port 43 of cylinder 28 and vented through port 42 to close valves 13 and again permit recirculation through bore 23 from ports 12.

A replaceable nozzle 44 communicates with and receives fluid from each input chamber 22. Plugs 45 in housing 11 close off chambers 22 and provide access to nozzles 44 so that they might be changed dependent on the particular fluids being mixed. Thus, nozzles 44 are replaceable so that the orifice diameter can be changed to balance the velocities of the fluid streams into a mixing chamber 46. Or, as would be evident to one skilled in the art, the nozzles could be replaced with a needle valve which would permit varying the size of the orifice. Each nozzle 44 emits fluid to a mixing chamber 46 which is shown in FIG. 1 as being closed by a plunger 48. At its lower end, plunger 48 is movable within a bushing 49 which can carry an adaptor (not shown) should the apparatus 10 be mounted, for example, in a molding machine.

Plunger 48 is threaded to the lower end of a piston rod 50 which extends through housing 11 and into hollow piston rod 24 with a suitable O-ring 51 providing the seal therebetween. Piston rod 24 thus acts as a cylinder housing for rod 50. At its upper end, rod 50 includes a piston 52 which is movable within the upper end of hollow piston rod 24 with an O-ring seal 53 being provided therebetween. Rod 50 includes a hollow upper extension 54 which passes through cylinder cap 38, again being sealed with O-ring 55.

Upon the introduction of fluid into the hollow upper extension 54 of rod 50, pressure against shoulder 56 within rod 24 moves rod 50 upwardly to retract plunger 48 and open mixing chamber 46. With fluid under pressure already in input chambers 22, all fluids will be emitted at high velocity to mixing chamber 46 through nozzles 44 simultaneous without lead or lag and will thereafter be dispensed out of the mixing chamber outlet vacated by plunger 48. To reverse the movement of rod 50, fluid can be introduced through port 58 in cylinder cap 38 to act on piston 52. As plunger 48 moves past nozzles 44 both are closed simultaneously to close the mixing chamber, and because it is of approximately the same diameter as the mixing chamber, the same is purged of any reacted chemicals remaining therein thereby eliminating the need for any chemical purging or flushing. Due to the tight fit required, plunger 48 can be made of a low friction material and is easily replaceable in the event of wear.

It is important that the operation of the pistons and valves be timed such that the valves 13 are first opened to provide fluid under pressure to the fluid input chambers 22 and then shortly thereafter, preferably a fraction of a second later, rod 50 is raised to permit the nozzles to simultaneously emit the fluids to the mixing chamber which is now open so that the mixed fluids may be immediately dispensed. Were the fluids to be emitted to the mixing chamber in a sequential mode rather than simultaneously, initially improper mixing could take place causing reject product, and in addition, if one input fluid leads at a higher pressure, a backflow in one of the input lines could be created.

While the apparatus just described is suitable for mixing and dispensing most any fluids, and could easily be used for injection molding and the like, it is particularly suitable for mixing and dispensing the materials which make urethane foam. In such instances, one of the fluids would usually be a polyol resin and the other an isocynate, such as toulene diisocyanate (TDI) or more often 4,4'-diphenylmethanediisocyanate (MDI). If frothing is required, as for example in a process for making panels having skins with a foam insulation therebetween, freon or some other frothing agent could be injected from a third input port into mixing chamber 46. It has been found that the apparatus described herein very satisfactorily produces a urethane foam material by keeping the fluids at approximately 70° F. and under a pressure of a minimum of 1000 psi. Selection of the proper nozzle 44 will keep the nozzle velocity of the fluids approximately the same so that they will meet at the center of the mixing chamber and thoroughly mix by the impingement method. It should therefore be evident that the device described herein meets the objects of the present invention and otherwise substantially improves the fluid impingement mixing art.

We claim:

1. Apparatus for mixing a plurality of fluids and thereafter dispensing the same comprising a fluid mixing chamber with at least one separate opening therein from which the fluids are dispensed; at least two nozzle means for emitting fluid to said mixing chamber; a fluid input chamber communicating with each said nozzle means; means to provide fluid under pressure to each said input chamber; said means to provide fluid under pressure including fluid input means, valve means, and means to operate said valve means from a closed to open position, said valve means communicating with said fluid input means and each said input chamber such that when said valve means is in an open position fluid is permitted to flow from said input means to each said input chamber; said means to operate said valve means including a fluid actuated cylinder having a stationary piston and piston rod and movable cylinder housing, said cylinder housing being connected to said valve means to open and close the same; and means to prevent said nozzle means from emitting fluid to said mixing chamber until after each input chamber receives fluid under pressure.

2. Apparatus according to claim 1 further comprising means to recirculate the fluid to said fluid input means when said valve means is in a closed position.

3. Apparatus according to claim 1 further comprising biasing means acting against said fluid actuated cylinder to maintain said valve means in a closed position.

4. Apparatus according to claim 1 wherein said means to prevent said nozzle means from emitting fluid includes a plunger normally closing said mixing chamber.

5. Apparatus according to claim 4 wherein said plunger is approximately the same size as said mixing chamber so that upon movement therethrough said mixing chamber and said opening therein are purged of fluids.

6. Apparatus according to claim 4 wherein said means to prevent said nozzle means from emitting fluid further includes a second fluid actuated cylinder having a piston rod carrying said plunger.

7. Apparatus for mixing a plurality of fluids and thereafter dispensing the same comprising a fluid mixing chamber with at least one separate opening therein from which the fluids are dispensed; at least two nozzle means for emitting fluid to said mixing chamber; a fluid input chamber communicating with each said nozzle means; means to provide fluid under pressure to each said input chamber; said means to provide fluid under pressure including fluid input means, valve means, and means to operate said valve means from a closed to open position, said valve means communicating with said fluid input means and each said input chamber such that when said valve means is in an open position fluid is permitted to flow from said input means to each said input chamber; said means to operate said valve means including a first fluid actuated cylinder; and means to prevent said nozzle means from emitting fluid to said mixing chamber until after each input chamber receives fluid under pressure; said means to prevent including a plunger normally closing said mixing chamber and a second fluid actuated cylinder having a piston rod carrying said plunger; said first fluid actuated cylinder including a hollow piston rod forming the cylinder housing for said second fluid actuated cylinder.

8. An apparatus according to claim 7 wherein said plunger is approximately the same size as said mixing chamber so that upon movement therethrough said mixing chamber and said opening therein are purged.

* * * * *